United States Patent
Park et al.

(10) Patent No.: US 10,122,503 B2
(45) Date of Patent: Nov. 6, 2018

(54) APPARATUS AND METHOD FOR CODING PACKET

(71) Applicant: KOREA AEROSPACE RESEARCH INSTITUTE, Daejeon (KR)

(72) Inventors: Hong Won Park, Daejeon (KR); Seok Ho Chang, Seoul (KR); Mee Sue Shin, Seongnam (KR)

(73) Assignee: Korea Aerospace Research Institute, Yuseong-gu, Daejeon (KR)

( * ) Notice: Subject to any disclaimer, the term of this patent is extended or adjusted under 35 U.S.C. 154(b) by 0 days.

(21) Appl. No.: 15/031,984

(22) PCT Filed: Mar. 3, 2016

(86) PCT No.: PCT/KR2016/002122
§ 371 (c)(1),
(2) Date: Aug. 12, 2016

(87) PCT Pub. No.: WO2016/144041
PCT Pub. Date: Sep. 15, 2016

(65) Prior Publication Data
US 2017/0104560 A1   Apr. 13, 2017

(30) Foreign Application Priority Data

Mar. 9, 2015 (KR) .................. 10-2015-0032678
Mar. 2, 2016 (KR) .................. 10-2016-0025141

(51) Int. Cl.
*H04L 5/00* (2006.01)
*H04B 7/06* (2006.01)
(Continued)

(52) U.S. Cl.
CPC ............ *H04L 5/0003* (2013.01); *H04B 7/06* (2013.01); *H04B 7/0669* (2013.01);
(Continued)

(58) Field of Classification Search
CPC ......... H04L 1/06; H04L 1/0631; H04L 1/007; H04L 1/0625; H04L 5/0003;
(Continued)

(56) References Cited

U.S. PATENT DOCUMENTS

| | | | |
|---|---|---|---|
| 7,590,182 B2* | 9/2009 | Ling | H04B 7/0417 375/219 |
| 7,995,656 B2* | 8/2011 | Chen | H04L 65/607 375/240.23 |

(Continued)

FOREIGN PATENT DOCUMENTS

| KR | 20120137925 A | 12/2012 |
|---|---|---|
| KR | 101241881 B1 | 3/2013 |

(Continued)

OTHER PUBLICATIONS

Hossain et al., "Hierarchical constellation for multi-resolution data transmission over block fading channels", in IEEE Transactions on Wireless Communications, vol. 5, No. 4, pp. 849-857, Apr. 2006.*

(Continued)

*Primary Examiner* — Berhanu Tadese
(74) *Attorney, Agent, or Firm* — Sandberg Phoenix & Von Gontard, PC (57) ABSTRACT

An apparatus for coding a plurality of packets in a multi-antenna system, the apparatus including a processor configured to determine space-time codes of the plurality of packets sequentially from a subsequent packet to maximize an average throughput of the plurality of packets, and a transmitter configured to transmit the plurality of packets to an antenna, is provided.

8 Claims, 6 Drawing Sheets

(51) Int. Cl.
| | |
|---|---|
| *H04L 29/06* | (2006.01) |
| *H04N 21/2383* | (2011.01) |
| *H04N 21/2385* | (2011.01) |
| *H04N 21/63* | (2011.01) |
| *H04L 1/06* | (2006.01) |

(52) U.S. Cl.
CPC .......... *H04L 1/0625* (2013.01); *H04L 5/0023* (2013.01); *H04L 5/0037* (2013.01); *H04L 5/0064* (2013.01); *H04L 65/4076* (2013.01); *H04L 65/607* (2013.01); *H04N 21/2383* (2013.01); *H04N 21/2385* (2013.01); *H04N 21/631* (2013.01)

(58) Field of Classification Search
CPC . H04L 65/4076; H04L 5/0023; H04L 5/0037; H04L 5/0064; H04L 65/607; H04B 7/04; H04B 7/0697; H04B 7/0669; H04B 7/06; H04N 19/37; H04N 19/66; H04N 21/2383; H04N 21/2385; H04N 21/631
See application file for complete search history.

(56) References Cited

U.S. PATENT DOCUMENTS

| | | | | |
|---|---|---|---|---|
| 8,537,693 B2* | 9/2013 | Sundaresan | ......... | H04L 12/1881 370/243 |
| 8,787,241 B2* | 7/2014 | Pinheiro | ................ | H04B 7/026 370/315 |
| 8,958,375 B2* | 2/2015 | Watson | ................ | H04L 1/0083 370/329 |
| 9,014,015 B2* | 4/2015 | Stamoulis | ............. | H04W 72/08 370/252 |
| 9,319,701 B2* | 4/2016 | Jeong | ................... | H04N 21/631 |
| 9,326,291 B2* | 4/2016 | Luo | ....................... | H04W 16/10 |
| 9,742,543 B2* | 8/2017 | Hedayat | ................... | H04L 1/12 |
| 2003/0128658 A1* | 7/2003 | Walton | ..................... | H04L 1/06 370/208 |
| 2003/0194022 A1* | 10/2003 | Hammons, Jr. | ....... | H04L 1/0059 375/299 |
| 2004/0057530 A1* | 3/2004 | Tarokh | .................. | H04L 1/0625 375/267 |
| 2004/0258026 A1* | 12/2004 | Lau | .......................... | H04B 7/06 370/335 |
| 2004/0264576 A1* | 12/2004 | Woods | .................. | H04N 19/63 375/240.24 |
| 2005/0078755 A1* | 4/2005 | Woods | .................. | H04N 19/119 375/240.24 |
| 2005/0113120 A1* | 5/2005 | Rappaport | ........... | H04B 7/0413 455/500 |
| 2006/0023748 A1* | 2/2006 | Chandhok | .......... | H04L 29/06027 370/469 |
| 2006/0056451 A1* | 3/2006 | Yano | .................... | H04B 7/0417 370/468 |
| 2006/0193388 A1* | 8/2006 | Woods | ................ | H04N 19/647 375/240.16 |
| 2006/0209749 A1* | 9/2006 | Blanz | ................... | H04L 1/0009 370/328 |
| 2007/0081587 A1* | 4/2007 | Raveendran | ........... | H04N 5/144 375/240.1 |
| 2007/0135152 A1* | 6/2007 | Kim | ...................... | H04L 1/0625 455/517 |
| 2007/0171808 A1* | 7/2007 | Wu | ...................... | H04B 7/0452 370/208 |
| 2007/0268959 A1* | 11/2007 | Bi | .......................... | H04J 13/20 375/146 |
| 2008/0144733 A1* | 6/2008 | ElGamal | ............... | H04L 1/0003 375/267 |
| 2008/0151101 A1* | 6/2008 | Tian | ....................... | H04N 5/145 348/448 |
| 2008/0259799 A1* | 10/2008 | van Beek | ............ | H04L 47/2416 370/235 |
| 2009/0086706 A1* | 4/2009 | Huang | .................. | H04L 1/0026 370/349 |
| 2009/0092073 A1* | 4/2009 | Doppler | ................. | H04B 7/022 370/315 |
| 2010/0086024 A1* | 4/2010 | Zhang | ............ | H04N 21/234327 375/240.02 |
| 2010/0234071 A1* | 9/2010 | Shabtay | ............... | H04B 7/0408 455/562.1 |
| 2011/0150111 A1* | 6/2011 | Oyman | ................. | H04L 1/0019 375/260 |
| 2011/0268176 A1* | 11/2011 | Jeong | .................... | H04L 1/0001 375/240.01 |
| 2012/0020279 A1* | 1/2012 | Kim | .................... | H04B 7/15592 370/315 |
| 2012/0077466 A1* | 3/2012 | O'Mahony | .... | H04N 21/234327 455/414.1 |
| 2012/0201189 A1* | 8/2012 | Jung | .................... | H04B 7/0413 370/315 |
| 2013/0336410 A1* | 12/2013 | Nguyen | ................. | H04N 19/46 375/240.25 |
| 2014/0087749 A1* | 3/2014 | Mar | ...................... | H04L 5/0023 455/452.2 |
| 2014/0321557 A1* | 10/2014 | Chang | ................... | H04N 19/37 375/240.27 |
| 2016/0087775 A1* | 3/2016 | Hedayat | ................ | H04L 1/12 370/329 |
| 2016/0100230 A1* | 4/2016 | Ma | ................... | H04N 21/44209 725/109 |
| 2017/0104560 A1* | 4/2017 | Park | ........................ | H04B 7/06 |
| 2017/0117996 A1* | 4/2017 | Lorca Hernando | ... | H04L 5/0073 |

FOREIGN PATENT DOCUMENTS

| | | |
|---|---|---|
| KR | 20130060967 A | 6/2013 |
| KR | 20130060976 A | 6/2013 |
| WO | 2010114344 A2 | 10/2010 |
| WO | WO 2012094975 A1 * | 7/2012 ..... H04N 21/234327 |

OTHER PUBLICATIONS

Hossain et al., Hierarchical constellation for multi-resolution data transmission over block fading channels, IEEE, vol. 5, No. 4, pp. 849-857, Apr. 2006.*

"Adaptation of SVC to Packet Loss and its Performance Analysis", The Korean Society of Broadcast Engineers, pp. 796-806, Nov. 2009.

PCT International Search report for International Application No. PCT/KR2016/002122 dated Mar. 3, 2016.

PCT International Search report for International Application No. PCT/KR2016/002122 dated Jun. 29, 2016.

* cited by examiner

APPARATUS AND METHOD FOR CODING PACKET

CROSS-REFERENCE TO RELATED APPLICATIONS

This application is the US National stage, under 35 U.S.C. § 371, of International App. No. PCT/KR2016/002122 which was filed on Mar. 3, 2016 and claims priority to Korean Application No. 10-2016-0025141 filed Mar. 2, 2016 and Korean Application No. 10-2015-0032678 filed Mar. 9, 2015.

TECHNICAL FIELD

Embodiments relate to packet coding technology, and more particularly, to technology that performs coding to optimize a throughput by determining space-time codes of packets in a multi-antenna wireless communication system.

BACKGROUND ART OF THE INVENTION

The number of possible cases for dividing a hierarchical multimedia source into a number of packets and assigning a separate space-time code to each packet to be transmitted is $M^{Np}$.

In $M^{Np}$, M denotes the number of types of assignable space-time codes, and Np denotes the number of packets. Among the $M^{Np}$ possible cases, a case that maximizes an average throughput of the multimedia source needs to be determined. As learned from the foregoing, the number of cases for assigning increases exponentially as the number of packets increases.

To optimize packet transmission, throughputs for all the $M^{Np}$ cases for assigning are calculated numerically, and a case with a maximum throughput is selected. Thus, a great computational complexity is needed.

BRIEF SUMMARY OF THE INVENTION

According to an aspect of the present invention, there is provided an apparatus for coding a plurality of packets in a multi-antenna system, the apparatus including a processor configured to determine space-time codes of the plurality of packets sequentially from a subsequent packet to maximize an average throughput of the plurality of packets, and a transmitter configured to transmit the plurality of packets to an antenna.

The processor may be configured to determine the space-time codes sequentially from a last packet to a first packet. The average throughput may be expressed using a packet error rate and a data transmission rate of each packet. The space-time codes may be associated with a multi-antenna wireless communication system. The plurality of packets may be associated with a hierarchical multimedia source. The hierarchical multimedia source may be associated with a scalable video or a progressive image.

According to another aspect of the present invention, there is also provided a method of coding a plurality of packets in a multi-antenna system, the method including determining space-time codes of the plurality of packets sequentially from a subsequent packet to maximize an average throughput of the plurality of packets, and transmitting the plurality of packets to an antenna.

The method may further include determining the space-time codes sequentially from a last packet to a first packet.

The method may further include expressing the average throughput using a packet error rate and a data transmission rate of each packet. The method may further include associating the space-time codes with a multi-antenna wireless communication system. The plurality of packets may be associated with a hierarchical multimedia source.

DETAILED DESCRIPTION OF THE INVENTION

Specific structural or functional descriptions of embodiments are merely disclosed as examples, and may be variously modified and implemented. Thus, the embodiments are not limited, and it is intended that various modifications, equivalents, and alternatives are also covered within the scope of the present disclosure.

Although terms of "first", "second", etc. are used to explain various components, the components are not limited to such terms. These terms are used only to distinguish one component from another component. For example, a first component may be referred to as a second component, or similarly, the second component may be referred to as the first component.

When it is mentioned that one component is "connected" or "accessed" to another component, it may be understood that the one component is directly connected or accessed to another component or that still one of more other components is interposed between the two components.

A singular expression includes a plural concept unless there is a contextually distinctive difference therebetween. Herein, the term "include" or "have" is intended to indicate that characteristics, numbers, steps, operations, components, elements, etc. disclosed in the specification or combinations thereof exist. As such, the term "include" or "have" should be understood to mean that there are additional possibilities of one or more other characteristics, numbers, steps, operations, components, elements or combinations thereof.

Unless specifically defined, all the terms used herein including technical or scientific terms have the same meaning as terms generally understood by those skilled in the art. Terms defined in a general dictionary should be understood so as to have the same meanings as contextual meanings of the related art. Unless definitely defined herein, the terms are not interpreted as having ideal or excessively formal meanings. Hereinafter, embodiments will be described in detail with reference to the accompanying drawings. Like reference numerals in the drawings denote like elements.

Figure 1:
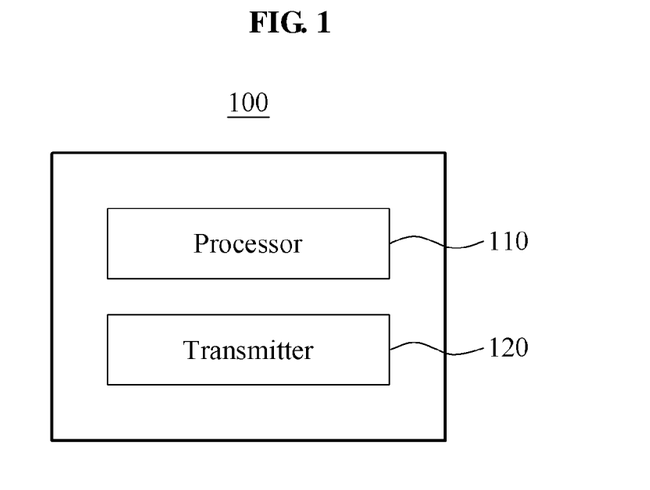
FIG. 1 is a block diagram illustrating a packet coding apparatus according to an embodiment.

FIG. 1 is a block diagram illustrating a packet coding apparatus according to an embodiment.

Referring to FIG. 1, a packet coding apparatus 100 may include a processor 110, and a transmitter 120. The processor 110 may determine space-time codes of a plurality of packets to be transmitted, sequentially from a subsequent packet, to maximize an average throughput of the plurality of packets. The transmitter 120 may transmit the plurality of packets to an antenna.

Figure 3:
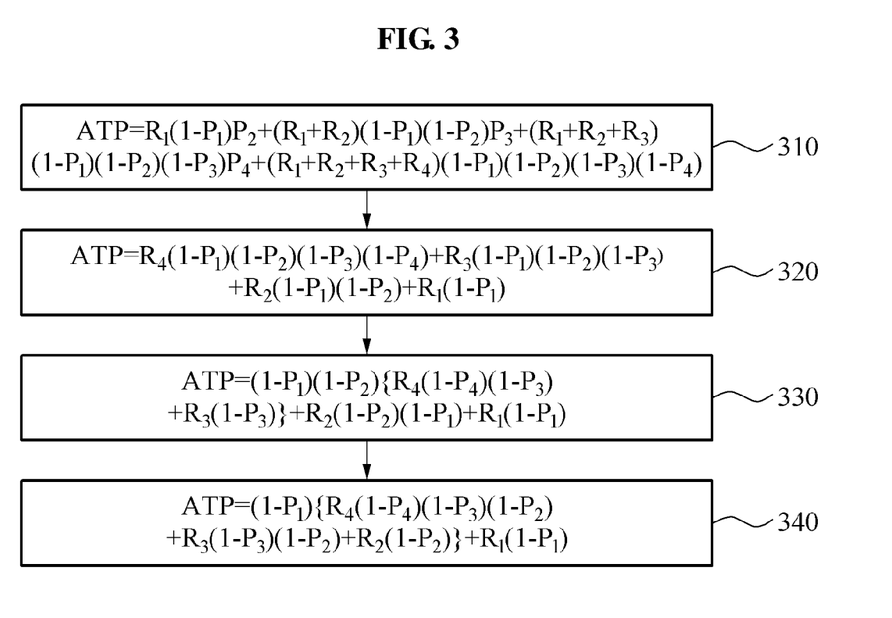
FIG. 3 is a diagram illustrating a method of maximizing an average throughput according to an embodiment.

Due to characteristics of a hierarchical multimedia, the hierarchical multimedia is transmitted in a form of flow of data transmitted consecutively through a series communication line, in detail, one bit at a time. In this example, in an aspect of overall packet validation, when an error occurs in a previously transmitted packet, packets subsequent to the corresponding packet may not be used for decoding although the subsequent packets are transmitted without error. In detail, a prior packet needs to be transmitted without error to transmit subsequent packets without error. Thus, by determining separate space-time codes of packets, sequentially from a subsequent packet to a relatively significant prior packet or in an inverse order, transmission of a multimedia source may be optimized. Hereinafter, for ease of description, an example of transmitting a multimedia source including four packets is provided. However, embodiments are not limited thereto. The embodiments are also applicable to an example of transmitting a greater number of packets. An average throughput when transmitting four packets may be expressed by Equation 1, which is also shown in a box 310 of FIG. 3.

$$ATP=R_1(1-P_1)P_2+(R_1+R_2)(1-P_1)(1-P_2)P_3+(R_1+R_2+R_3)(1-P_1)(1-P_2)(1-P_3)P_4+(R_1+R_2+R_3+R_4)(1-P_1)(1-P_2)(1-P_3)(1-P_4)$$ [Equation 1]

In an apparatus for coding a plurality of packets in a multi-antenna system, the average throughput of the multimedia may be expressed using a packet error rate and a data transmission rate of each packet. In Equation 1, ATP stands for an average throughput, $R_i$ (bits) denotes a data transmission rate of each packet or a size of a packet, and $P_i$ denotes a packet error rate. The first term is related to the number of cases in which a first packet with a size of $R_1$ is transmitted with a probability of $(1-P_1)$ and an error occurs in a second packet with a probability of $P_2$. Similarly, the second term is related to the number of cases in which the first packet and the second packet $(R_1+R_2)$ are transmitted with probabilities of $(1-P_1)$ and $(1-P_2)$ and an error occurs in a third packet with a probability of $P_3$. Similarly, by calculating the third term and the fourth term, the average throughput may be calculated. In space-time coding used in a multi-antenna system, for example, a multiple-input multiple-output (MIMO) system, an overall average throughput may vary based on a space-time code to be determined with respect to a packet, as learned in Equation 1. In a related art, calculation is performed with respect to all cases for a space-time code that maximizes the average throughput, and thus a processor may be overloaded. However, when a packet coding method provided herein is used, such overload may be prevented. $R_i$ and $P_i$ in Equation 1 vary based on a space-time code to be determined for a packet, and there is a trade-off between $R_i$ and $P_i$. Thus, it is difficult to determine a space-time code that maximizes the overall average throughput. Hereinafter, the trade-off will be described with reference to FIG. 2.

Figure 2:
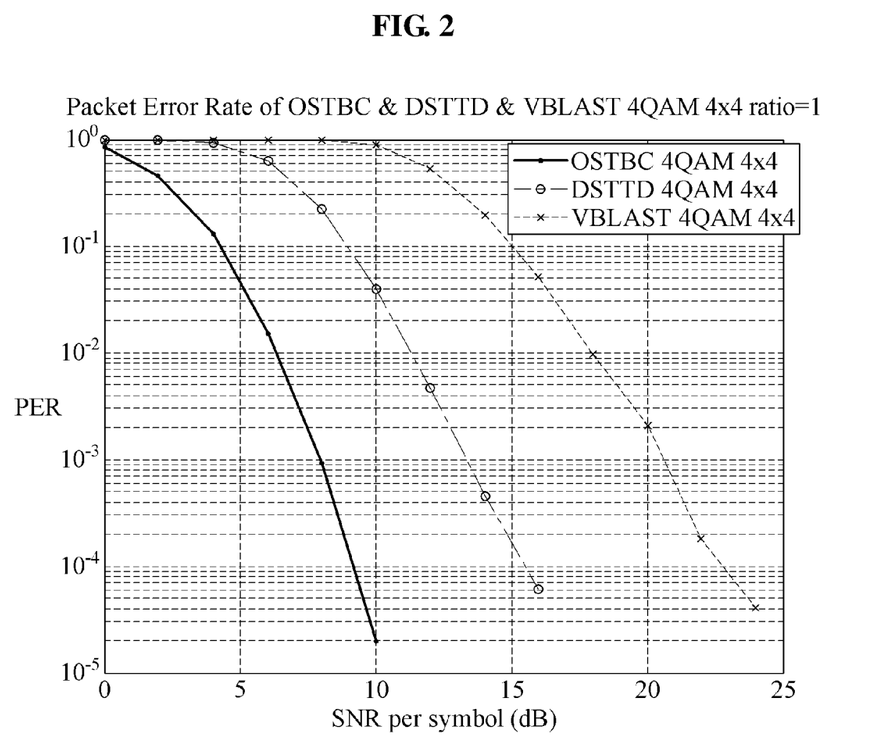
FIG. 2 is a graph illustrating packet error rates of space-time codes according to an embodiment.

FIG. 2 is a graph illustrating packet error rates of space-time codes according to an embodiment.

In an apparatus for coding a plurality of packets in a multi-antenna system, a space-time code may be associated with a multi-antenna wireless communication system. In general, space-time coding has a trade-off between a data transmission rate and a packet error rate. Herein, descriptions will be provided based on space-time codes of orthogonal space-time block code (OSTBC), double-space time transmit diversity (D-STTD), and vertical-bell laboratories layered space-time (V-BLAST) which are widely used. However, embodiments are not limited thereto. The embodiments are applicable to all space-time codes. A trade-off between a data transmission rate and a packet error rate of each space-time code in a 4×4 MIMO system including four transmit antennas and four receive antennas is shown in Table 1. A relationship between a packet error rate and a signal-to-noise ratio (SNR) per symbol is shown in the graph of FIG. 2.

TABLE 1

| | Data transmission rate (Ri) | Packet error rate (Pi) |
|---|---|---|
| OSTBC | Low (1.5 bits/sec/Hz) | Low |
| D-STTD | Middle (4 bits/sec/Hz) | Middle |
| V-BLAST | High (4 bits/sec/Hz) | High |

In detail, since the packet error rate $P_i$ increases as the data transmission rate $R_i$ increases, it may not be easy to determine an optimal space-time code to be assigned to a predetermined packet. When assigning three space-time codes of OSTBC, D-STTD, and V-BLAST to the four packets suggested above, the number of possible cases is "81". A space-time coding scheme provided herein may dramatically reduce the number of cases without performing such an exhaustive search, which will be described in detail with reference to FIG. 3.

FIG. 3 is a diagram illustrating a method of maximizing an average throughput according to an embodiment.

In an apparatus for coding a plurality of packets in a multi-antenna system, a processor may determine space-time codes of the plurality of packets sequentially from a last packet to a first packet. By determining the space-time codes sequentially from the last packet and performing the same process to the first packet, the number of cases may be dramatically reduced when compared to an existing algorithm. In the existing algorithm, the number of cases increases exponentially as the number of packets and the number of space-time codes increase. However, herein, the number of cases may be reduced by a product of the number of packets and the number of space-time codes. To investigate the foregoing method in detail, Equation 1 may be arranged with respect to $R_4$ as expressed by Equation 2, which is also shown in a box 320 of FIG. 3.

$$ATP=R_4(1-P_1)(1-P_2)(1-P_3)(1-P_4)+R_3(1-P_1)(1-P_2)(1-P_3)+R_2(1-P_1)(1-P_2)+R_1(1-P_1)$$ [Equation 2]

When Equation 1 is arranged as shown in Equation 2, a space-time code to be used for the last packet, for example, the fourth packet in Equation 2, may be determined among various space-time codes, for example, three space-time codes of OSTBC, D-STTD, and V-BLAST. Variables related to the fourth packet in Equation 2 are $R_4$ and $P_4$, and values related to the other packets may be regarded as constants. In detail, $R_4$ and $P_4$ may be determined based on the space-time code to be used for the fourth packet, and thus a space-time code that maximizes ATP of Equation 2 may be determined.

Here, it may be learned from Equation 2 that $R_3$, $P_3$, $R_2$, $P_2$, $R_1$, and $P_1$ do not need to be determined yet when determining $R_4$ and $P_4$. In detail, irrespective of space-time codes to be assigned to the first, second, and third packets, the space-time code of the fourth packet to maximize ATP may be determined.

To determine a code of the third packet, Equation 1 may be arranged similarly as expressed by Equation 3, which is also shown in a box 330 of FIG. 3.

$$ATP=(1-P_1)(1-P_2)\{R_4(1-P_4)(1-P_3)+R_3(1-P_3)\}+R_2(1-P_2)(1-P_1)+R_1(1-P_1) \quad \text{[Equation 3]}$$

When the space-time code of the last packet is determined, a space-time code to be used for a packet prior to the last packet, for example, the third packet in the above example, may be determined. In detail, in the situation in which $R_4$ and $P_4$ are determined based on the space-time code determined in the previous operation, the space-time code of the third packet to maximize the average throughput may be determined. Here, it may also be learned that $R_2$, $P_2$, $R_1$, and $P_1$ do not need to be determined yet when determining $R_3$ and $P_3$. Irrespective of space-time codes to be assigned to the first and second packets, the space-time code of the third packet to maximize the average throughput may be determined while data transmission rates and the space-time codes of the first and second packets are regarded as constants.

To determine a code of the second packet, Equation 1 may be arranged similarly as expressed by Equation 4, which is also shown in a box 340 of FIG. 3.

$$ATP=(1-P_1)\{R_4(1-P_4)(1-P_3)(1-P_2)+R_3(1-P_3)(1-P_2)+R_2(1-P_2)\}+R_1(1-P_1) \quad \text{[Equation 4]}$$

In Equation 4, a space-time code to be used for packet prior to the third packet, for example, the second packet in the above example, may be determined. In detail, in the situation in which $R_4$, $P_4$, $R_3$, and $P_3$ are determined based on the space-time codes determined in the previous operations, the space-time code of the second packet to maximize the average throughput may be determined. Similarly, $R_1$ and $P_1$ do not need to be determined yet when determining $R_2$ and $P_2$, and may be regarded as constants. In detail, irrespective of a space-time code to be assigned to the first packet, the space-time code of the second packet to maximize the average throughput may be determined. When the space-time code of the second packet is determined, a space-time code of the first packet to maximize the average throughput may be determined finally.

In the apparatus for coding a plurality of packets in the multi-antenna system, the plurality of packets may be associated with a hierarchical multimedia source. The multimedia source may be associated with a scalable video or a progressive image. The hierarchical multimedia source may be associated with a multimedia to be coded hierarchically. Hierarchical coding refers to a qualitative hierarchy-based coding scheme in which a lowermost hierarchy contains minimum information and succeeding hierarchies contain more information in a qualitative aspect. Such a compression scheme is effective for a packet exchange network where network resources are shared between a number of traffic streams, and delays and losses are expected. Due to such characteristics of the hierarchical multimedia, the hierarchical multimedia is transmitted in a form of flow of data transmitted consecutively through a series communication line, in detail, one bit at a time. Thus, by applying the packet coding method provided herein, a load of the processor may be reduced. Scalable video coding (SVC) is a name for the Annex G extension of H.264/MPEG-4 AVC (a family of block-oriented motion-compensation standards for the recording, compression, and distribution of video content developed by the Moving Picture Experts Group-4, Advanced Video Coding) video compression standard. SVC may be used to encode a high-quality video bitstream including one or more subset bitstreams. A subset bitstream may represent a relatively low spatial resolution (relatively small screen), relatively low temporal resolution (relatively low frame rate), or relatively low-quality video signal. By performing SVC using the packet coding apparatus suggested herein, a multimedia to be used for standard-definition television (SDTV) and digital multimedia broadcasting (DMB) may be coded. Progressive image transmission refers to a scheme of progressively transmitting a portion of image data, rather than transmitting the whole image data, which is effective in interactive image transmission to a user over narrow-bandwidth channels such as telephone lines. Image data to be transmitted may be coded using various image coding schemes. At first, a rough form of an image may be represented, and the image of improved quality may be progressively restored by transmitting additional data. Such a progressive image may be coded and transmitted based on a hierarchical multimedia, and thus the packet coding apparatus suggested herein may be used for coding the progressive image.

Figure 4:
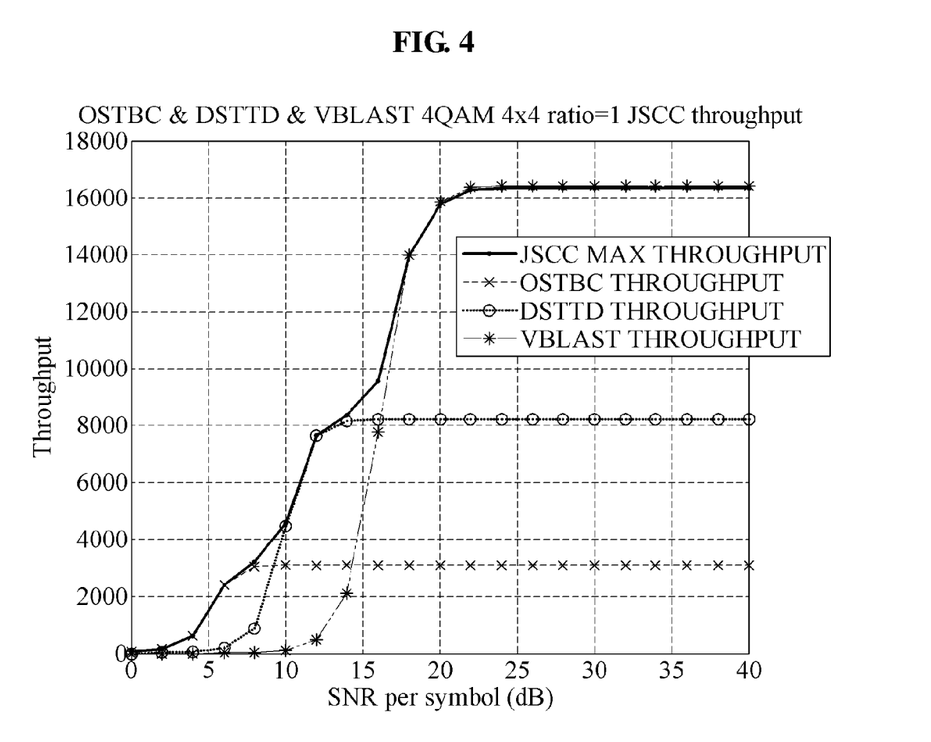
FIG. 4 is a graph illustrating average throughputs with respect to space-time codes according to an embodiment.

FIG. 4 is a graph illustrating average throughputs with respect to space-time codes according to an embodiment.

The graph of FIG. 4 illustrates throughputs of space-time codes when OSTBC, D-STTD, or V-BLAST is used solely or a combination thereof is used in a 4×4 MIMO system. JSCC in FIG. 4 is an abbreviation for "Joint Source Channel Coding: OSTBC, D-STTD, and V-BLAST each includes a period in which an average throughput is maximized, when compared to the other space-time codes. Thus, by determining a space-time code of a packet using all of OSTBC, D-STTD, and V-BLAST, the throughput may be maximized.

For example, the number of cases of assigning three space-time codes to sixteen packets is $3^{16}$. A result of applying a packet coding algorithm provided herein and an exhaustive search to determine space-time codes to be assigned to maximize an ATP by comparing ATPs of the $3^{16}$ possible cases is shown in Table 2, and the same result may be obtained.

TABLE 2

| SNR(dB) | (1: OSTBC, 2: D-STTD, 3: V-BLAST) | | | | | | | | | | | | | | | |
|---|---|---|---|---|---|---|---|---|---|---|---|---|---|---|---|---|
| 8  | 1 | 1 | 1 | 1 | 1 | 1 | 1 | 1 | 1 | 1 | 1 | 1 | 1 | 2 | 2 | 2 |
| 10 | 2 | 2 | 2 | 2 | 2 | 2 | 2 | 2 | 2 | 2 | 2 | 2 | 2 | 2 | 2 | 2 |
| 12 | 2 | 2 | 2 | 2 | 2 | 2 | 2 | 2 | 2 | 2 | 2 | 2 | 2 | 2 | 2 | 2 |
| 14 | 2 | 2 | 2 | 2 | 2 | 2 | 2 | 2 | 2 | 2 | 2 | 2 | 2 | 3 | 3 | 3 |
| 16 | 2 | 2 | 2 | 3 | 3 | 3 | 3 | 3 | 3 | 3 | 3 | 3 | 3 | 3 | 3 | 3 |

When the scheme suggested herein is used, average throughputs of only 16×3=48 cases in total need to be compared, and thus a computational complexity may be reduced. In detail, the present disclosure may perform optimized coding when a wireless communication system transmits a progressive image or a scalable video which is a hierarchical multimedia source including a number of packets, thereby considerably reducing a computational complexity for determining a space-time coding scheme to be applied to each packet. In particular, a great computational complexity is needed for assigning optimal space-time codes to a large number of packets in real time. Thus, the present disclosure may greatly contribute to implementation of an effective real-time multimedia transmission system.

Figure 5:
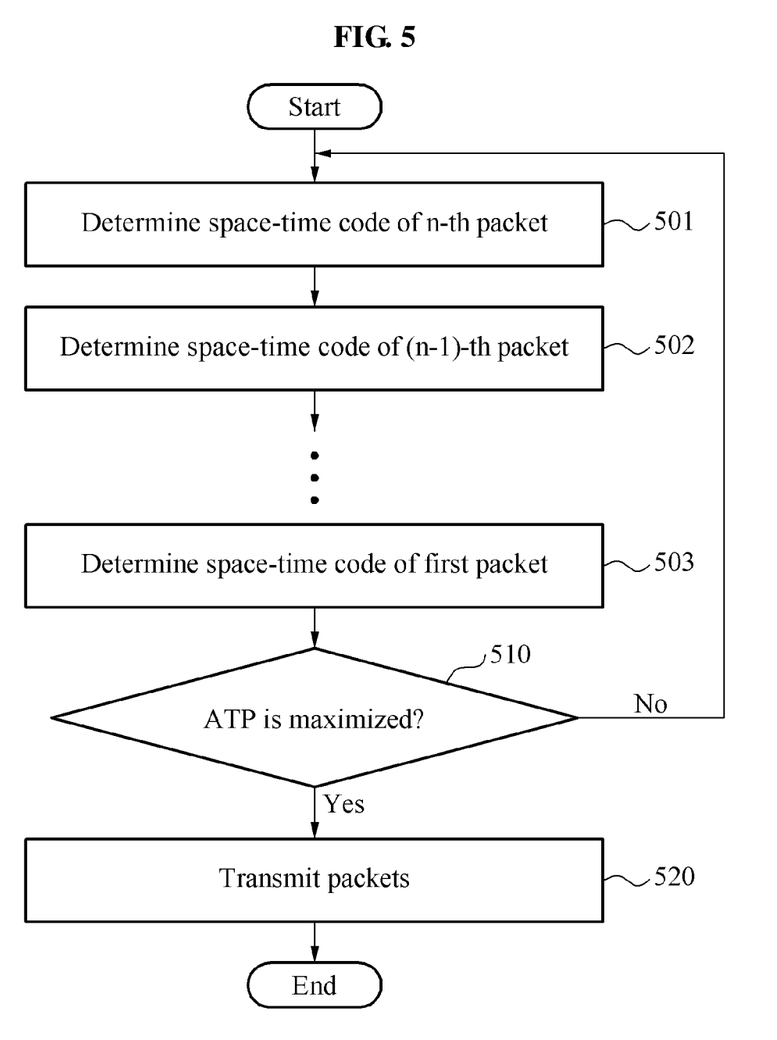
FIG. 5 is a flowchart illustrating an algorithm of a packet coding method according to an embodiment.
Figure 6:
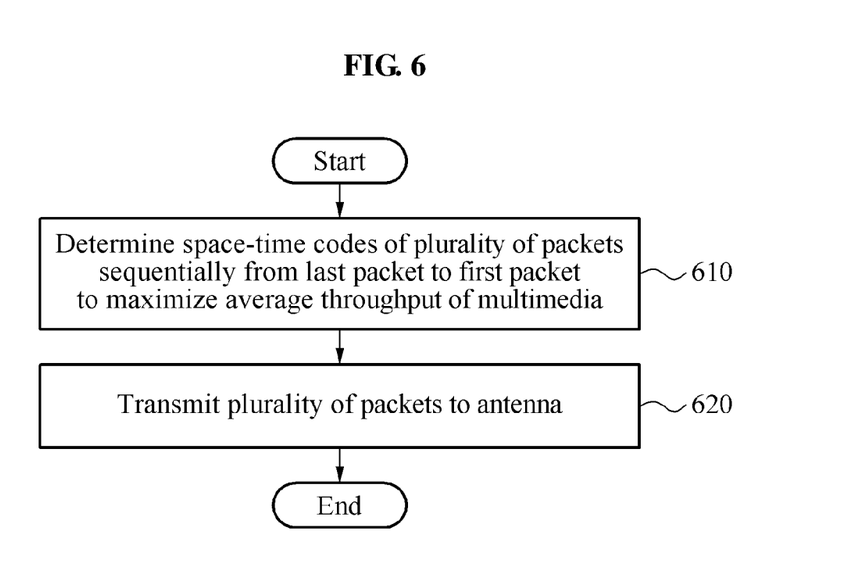
FIG. 6 is a flowchart illustrating an algorithm of a packet coding method according to another embodiment.

FIG. 5 is a flowchart illustrating an algorithm of a packet coding method according to an embodiment. FIG. 6 is a flowchart illustrating an algorithm of a packet coding method according to another embodiment.

Referring to FIG. 6, in operation 610, a packet coding method may determine space-time codes of a plurality of packets sequentially from a subsequent packet to maximize an average throughput of the plurality of packets. In operation 620, the packet coding method may transmit the plurality of packets to an antenna. Referring to FIG. 5, the packet coding method may be used to hierarchically code a multimedia. Due to characteristics of a hierarchical multimedia, the hierarchical multimedia is transmitted in a form of flow of data transmitted consecutively through a series communication line, in detail, one bit at a time. In this example, in an aspect of overall packet validation, when an error occurs in a previously transmitted packet, packets subsequent to the corresponding packet may not be used for decoding although the subsequent packets are transmitted without error. In detail, a prior packet needs to be transmitted without error to transmit subsequent packets without error. Thus, by determining separate space-time codes of packets, sequentially from a subsequent packet to a relatively significant prior packet or in an inverse order, transmission of a multimedia source may be optimized.

As described above, to transmit n packets, a method of determining space-time codes of the n packets sequentially from a last packet to maximize an average throughput may be used. The space-time codes may correspond to space-time codes of OSTBC, D-STTD, and V-BLAST. However, embodiments are not limited thereto.

In a method of coding a plurality of packets in a multi-antenna system, the average throughput of the multimedia may be expressed using a packet error rate and a data transmission rate of each packet. In space-time coding used in a multi-antenna system, for example, a MIMO system, an overall average throughput may vary based on a space-time code to be determined with respect to a packet. In the related art as described above, calculation is performed with respect to all cases for a space-time code that maximizes the average throughput, and thus a processor may be overloaded. However, when a packet coding method provided herein is used, such overload may be prevented. However, $R_i$ denoting a data transmission rate of a packet and $P_i$ denoting a packet error rate of the packet vary based on a space-time code to be determined for a packet, and there is a trade-off between $R_i$ and $P_i$. Thus, it is difficult to determine a space-time code that maximizes the overall average throughput.

In the method of coding a plurality of packets in the multi-antenna system, a space-time code may be associated with a multi-antenna wireless communication system. In general, space-time coding has a trade-off between a data transmission rate and a packet error rate. In detail, when the data transmission rate $R_i$ increases, the packet error rate $P_i$ also increases. Thus, it may not be easy to determine an optimal space-time code to be assigned to a predetermined packet. For example, when m space-time codes are to be assigned to n packets, the number of possible cases is $m^n$. The space-time coding scheme provided herein may dramatically reduce the number of cases by m×n, without performing the exhaustive search described above.

In an apparatus for coding a plurality of packets in a multi-antenna system, the processor may determine space-time codes of the plurality of packets sequentially from a last packet to a first packet. Referring to FIG. 5, when n packets are to be transmitted, the packet coding apparatus may determine a space-time code of an n-th packet, in operation 501. In this example, similarly, a space-time code that maximizes the average throughput may be determined. When the space-time code of the n-th packet is determined, the packet coding apparatus may determine a space-time code of an (n−1)-th packet, in operation 502. By continuously performing the same process, the packet coding apparatus may determine a space-time code of a first packet, in operation 503. In an existing method, the number of cases increases exponentially as the number of packets and the number of space-time codes increase. However, when the foregoing method is used, the number of cases may be reduced by a product of the number of packets and the number of space-time codes. In this example, when the space-time code is determined, space-time codes of the other packets may be regarded as constants, whereby the average throughput may be maximized. When the space-time codes of the packets are determined, the packet coding apparatus may verify whether the average throughput is maximized, in operation 510. When the average throughput is maximized, the packet coding apparatus may transmit the n packets to an antenna, in operation 520. Conversely, when the average throughput is not maximized, the packet coding apparatus may repeat the operation of determining space-time codes sequentially from the last packet, for example, the n-th packet. Through the feedback, optimal space-time codes may be determined. In detail, according to embodiments, optimized coding may be performed when transmitting a progressive image or a scalable video which is a hierarchical multimedia source including a number of packets in a wireless communication system, whereby a computational complexity for determining a space-time coding scheme to be applied to each packet may be greatly reduced.

In the method of coding a plurality of packets in the multi-antenna system, the plurality of packets may be associated with a hierarchical multimedia source. The multimedia source may be associated with a scalable video or a progressive image. The hierarchical multimedia source may be associated with a multimedia to be coded hierarchically. Hierarchical coding refers to a qualitative hierarchy-based coding scheme in which a lowermost hierarchy contains minimum information and succeeding hierarchies contain more information in a qualitative aspect. Such a compression scheme is effective for a packet exchange network where network resources are shared between a number of traffic streams, and delays and losses are expected. Due to such characteristics of the hierarchical multimedia, the hierarchical multimedia is transmitted in a form of flow of data transmitted consecutively through a series communication line, in detail, one bit at a time. Thus, by applying the packet coding method provided herein, a load of the processor may be reduced. SVC is a name for the Annex G extension of H.264/MPEG-4 AVC video compression standard. SVC may be used to encode a high-quality video bitstream including one or more subset bitstreams. A subset bitstream may represent a relatively low spatial resolution (relatively small screen), relatively low temporal resolution (relatively low frame rate), or relatively low-quality video signal. By performing SVC using the packet coding apparatus suggested herein, a multimedia to be used for SDTV and DMB may be coded. Progressive image transmission refers to a scheme of progressively transmitting a portion of image data, rather than transmitting the whole image data, which is effective in interactive image transmission to a user over narrow-bandwidth channels such as telephone lines. Image data to be transmitted may be coded using various image coding schemes. At first, a rough form of an image may be represented, and the image of improved quality may be progressively restored by transmitting additional data. Such a progressive image may be coded and transmitted based on a hierarchical multimedia, and thus the packet coding apparatus suggested herein may be used for coding the progressive image. Detailed descriptions of the packet coding method are the same as the descriptions of the packet coding apparatus, and thus duplicated descriptions will be omitted for conciseness.

The units and/or modules described herein may be implemented using hardware components and software components. For example, the hardware components may include microphones, amplifiers, band-pass filters, audio to digital converters, and processing devices. A processing device may be implemented using one or more hardware devices configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purposes of simplicity, the description of a processing device is described in the singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed to provide example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claim.

The invention claimed is:

1. An apparatus for coding a plurality of packets in a multi-antenna system associated with a hierarchical multimedia source, the apparatus comprising:

a processor
configured to determine space-time codes of the plurality of packets associated with the hierarchical multimedia source, using an average throughput (ATP) expressed according to the following Equation:

$$ATP=R_1(1-P_1)P_2+(R_1+R_2)(1-P_1)(1-P_2)P_3+(R_1+R_2+R_3)(1-P_1)(1-P_2)(1-P_3)P_4+ \ldots +(R_1+R_2+R_3+ \ldots +R_{n-1})(1-P_1)(1-P_2)(1-P_3) \ldots (1-P_{n-1})P_n+(R_1+R_2+R_3+ \ldots +R_n-1+R_n)(1-P_1)(1-P_2)(1-P_3) \ldots (1-P_{n-1})(1-P_n)$$

wherein $R_1, R_2 \ldots R_{n-1}$ and $R_n$ denote a data transmission rate of each packet or size of packet to be transmitted; $P_1, P_2 \ldots P_{n-1}$ and $P_n$ denote a packet error rate of each packet to be transmitted; 'n' denotes the number of packets to be transmitted, wherein, the processor is to verify whether the average throughput of the plurality of packets is maximized when the space-time codes of the packets are determined; and a transmitter configured to transmit the plurality of coded packets to an antenna.

2. The apparatus of claim 1, wherein the space-time codes are associated with a multi-antenna wireless communication system.

3. The apparatus of claim 1, wherein the plurality of packets is associated with a scalable video or a progressive image.

4. A method of coding a plurality of packets in a multi-antenna system associated with a hierarchical multimedia source, the method comprising:

determining space-time codes of the plurality of packets associated with the hierarchical multimedia source, using an average throughput (ATP) expressed according to the following Equation:

$$ATP=R_1(1-P_1)P_2+(R_1+R_2)(1-P_1)(1-P_2)P_3+(R_1+R_2+R_3)(1-P_1)(1-P_2)(1-P_3)P_4+ \ldots +(R_1+R_2+R_3+ \ldots +R_{n-1})(1-P_1)(1-P_2)(1-P_3) \ldots (1-P_{n-1})P_n+(R_1+R_2+R_3+ \ldots +R_n-1+R_n)(1-P_1)(1-P_2)(1-P_3) \ldots (1-P_{n-1})(1-P_n)$$

wherein $R_1, R_2 \ldots R_{n-1}$ and $R_n$ denote a data transmission rate of each packet or size of packet to be transmitted; $P_1, P_2 \ldots P_{n-1}$ and $P_n$ denote a packet error rate of each packet to be transmitted; 'n' denotes the number of packets to be transmitted, verifying whether the average throughput of the plurality of packets is maximized when the space-time codes of the packets are determined; and transmitting the plurality of coded packets to an antenna.

5. The method of claim 4, further comprising:
associating the space-time codes with a multi-antenna wireless communication system.

6. The method of claim 4, wherein the plurality of packets is associated with a scalable video or a progressive image.

7. A non-transitory computer-readable medium comprising a program for instructing a computer to perform a method of coding a plurality of packets in a multi-antenna system associated with a hierarchical multimedia source, the method comprising:

determining space-time codes of the plurality of packets associated with the hierarchical multimedia source, using an average throughput (ATP) expressed according to the following Equation:

$$ATP = R_1(1-P_1)P_2 + (R_1+R_2)(1-P_1)(1-P_2)P_3 + (R_1+R_2+R_3)(1-P_1)(1-P_2)(1-P_3)P_4 + \ldots + (R_1+R_2+R_3+\ldots+R_{n-1})(1-P_1)(1-P_2)(1-P_3)\ldots(1-P_{n-1})P_n + (R_1+R_2+R_3+\ldots+R_n-1+R_n)(1-P_1)(1-P_2)(1-P_3)\ldots(1-P_{n-1})(1-P_n)$$

wherein $R_1, R_2 \ldots R_{n-1}$ and $R_n$ denote a data transmission rate of each packet or size of packet to be transmitted; $P_1, P_2 \ldots P_{n-1}$ and $P_n$ denote a packet error rate of each packet to be transmitted; 'n' denotes the number of packets to be transmitted, verifying whether the average throughput of the plurality of packets is maximized when the space-time codes of the packets are determined; and transmitting the plurality of coded packets to an antenna.

8. The non-transitory computer-readable medium of claim 7, wherein the plurality of packets is associated with a scalable video or a progressive image.

* * * * *